United States Patent [19]

Wilhelm et al.

[11] 4,412,456

[45] Nov. 1, 1983

[54] LOAD SENSING PROBE

[75] Inventors: Donald F. Wilhelm, Maumee; Robert L. Moser, Toledo, both of Ohio

[73] Assignee: Helm Instrument Company, Inc., Toledo, Ohio

[21] Appl. No.: 348,992

[22] Filed: Feb. 16, 1982

[51] Int. Cl.³ .......................... G01L 1/22; G01L 5/00
[52] U.S. Cl. .............................. 73/862.65; 73/862.06; 73/768
[58] Field of Search ........... 73/862.06, 862.54, 862.65, 73/768, 781

[56] References Cited

U.S. PATENT DOCUMENTS

| 3,444,390 | 5/1969 | Breidenbach et al. | 307/116 |
| 4,246,783 | 1/1981 | Steven et al. | 73/161 |
| 4,280,363 | 7/1981 | Johansson | 73/862.65 X |
| 4,342,233 | 8/1982 | Edmondson et al. | 73/862.06 |

Primary Examiner—Steven L. Stephan
Assistant Examiner—Brian Tumm
Attorney, Agent, or Firm—Wilson, Fraser, Barker & Clemens

[57] ABSTRACT

A load sensing probe for monitoring working forces in compressive elements such as found in presses and other machine tools is disclosed. The probe has an elongate configuration which allows it to be mounted at a point remote from its load sensing end and enables it to be conveniently used with a plurality of similar probes in relatively confined spaces. A split plug includes a slot defining two sensing arms, which arms are pushed outwardly into engagement with an accommodating cavity formed in a back-up member of the machine tool. The probe is sensitive to relative closing movement of the cavity caused by compressive strain in the back-up member.

17 Claims, 4 Drawing Figures

LOAD SENSING PROBE

BACKGROUND OF THE INVENTION

1. Field of the Invention

The present invention relates in general to force-sensitive transducers and in particular to a load sensing probe for measuring the work forces present in a machine tool.

2. Description of the Prior Art

The ability to measure force or load is a vital part of many industrial processes. Recognizing that a structure undergoes dimensional changes when subjected to a load, a measure of the dimensional change in a structure can accurately indicate the amount of force applied thereto. Such measurement is usually made through the use of a wire, foil, or semiconductor element intimately bonded to the structure. By measuring the change in the electrical resistance of the element, which resistance is a function of the change in cross-section of the element due to alterations in the dimensions of a structure, it is possible to accurately measure the load applied to the structure.

Many transducer devices have been developed for attachment to structures for measuring the amount of stress applied thereto. U.S. Pat. No. 3,444,390 to Breidenbach et al. and 4,171,646 to Dybel et al. both disclose measuring devices for use on machine tools such as forges, presses, and the like. Generally, such prior art devices are not sufficiently sensitive or physically constructed to be readily adaptable for use in working areas of a machine near the tool in order to directly measure forces on the tools. For example, the transducer arrangements disclosed in the above-mentioned patents are incapable of directly measuring the working load on a tool. This inability to directly measure tool loading is a particularly acute problem when it is desired to monitor the individual loads on a plurality of tools carried on a common base and caused to do work simultaneously.

Ideally, the apparatus for measuring the work forces in a machine tool is mounted in an area of the machine which is shielded to protect the apparatus from physical damage resulting from inadvertent impact or from contamination by debris or lubricants. It is also desirable that the load measuring apparatus be readily accessible for inspection, removal, and repair or maintenance.

SUMMARY OF THE INVENTION

The present invention relates to a load sensing probe adapted to extend laterally into a back-up member through which compressive tool work forces are axially projected. The back-up member can be embodied as a tool support face plate having a laterally-extending cavity for accommodating the probe. The probe is adapted to sense relative closing movement between opposing sides of the accommodating cavity, the movement caused by compressive strain in the face plate generated by the tool work forces. The probe is elongate in configuration and engages the inner wall of the cavity to sense the work forces acting on immediately adjacent tooling areas. The probe is selective in its sensitivity so that it can be employed in a face plate at a discrete point of a limited area as compared to the total projected area of the face plate. Accordingly, several similar probes, one for each tool station, can be utilized in a single face plate supporting a plurality of spaced tools.

The probe includes a split plug portion having an enlarged head, a cylindrical shoulder, an elongate stem, and a disk-shaped sensing member. A plurality of conventional strain gauges are mounted on the sensing member to detect compressive strain. A central aperture extends through the longitudinal axis of the split plug. A slot is formed in the sensing member and a portion of the stem defines two movable sensing arms. A split plug pin having an outwardly tapered end portion is longitudinally inserted through the aperture into threaded cooperation with a nut. Upon tightening the nut, the tapered end of the pin is drawn upwardly within the split plug, causing the sensing arms to be pushed outwardly into frictional engagement with the inside wall of the accommodating cavity until a desired predetermined level of preloading is reached. Tool working forces result in relative closing movement of the cavity, which movement causes dimensional changes in the sensing member which can be measured by the strain gauges.

It is an object of the present invention to provide a sensor to continuously monitor operating conditions and parameters in a machine tool.

It is another object of the present invention to provide an apparatus to monitor the individual loads of a plurality of tools carried on a common base and caused to work simultaneously.

It is a further object of the present invention to provide a load sensing probe, in a multi-station machine tool, which is readily accessible for inspection, removal, and maintenance.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
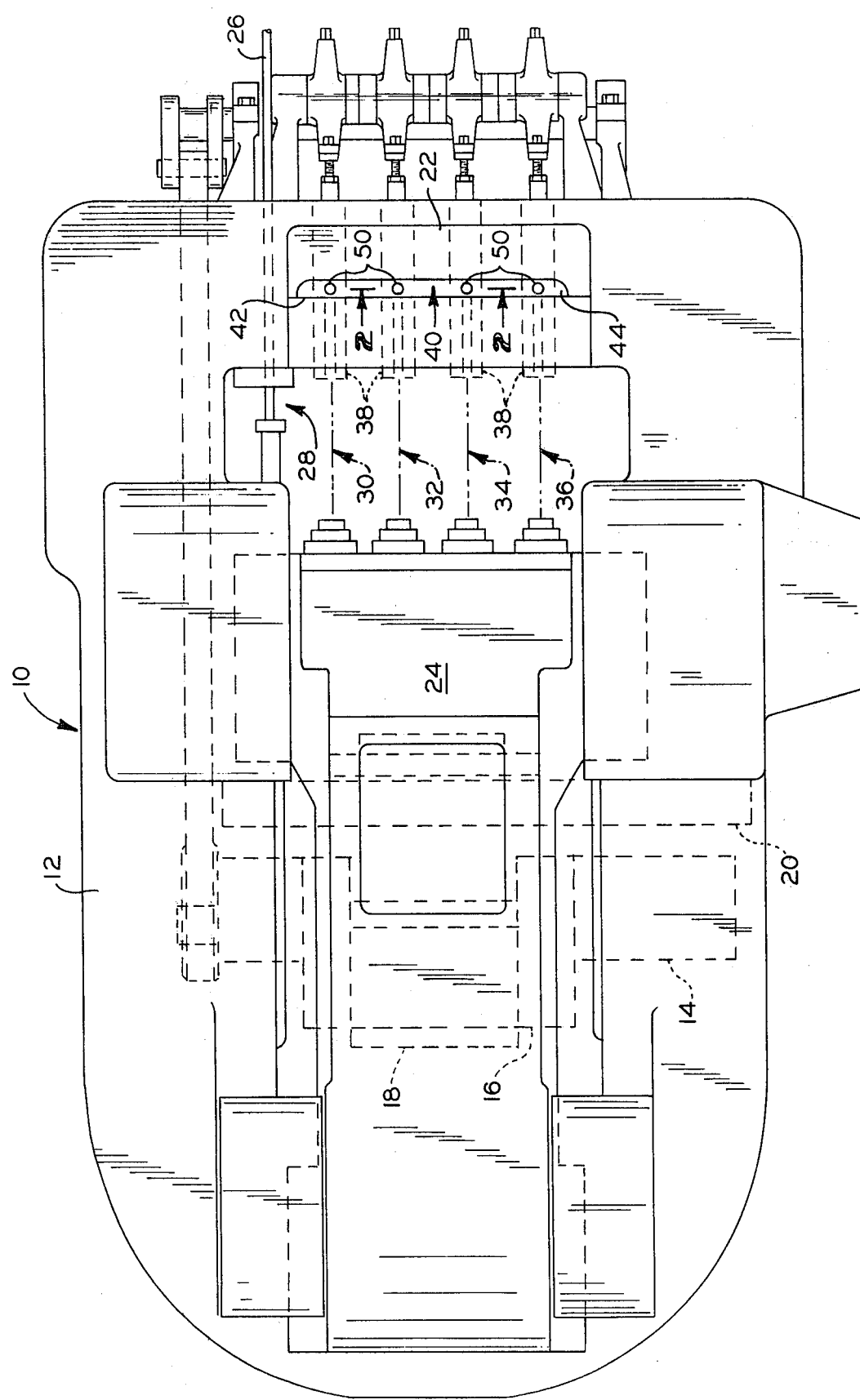
FIG. 1 is a top plan view of a machine tool having a plurality of progressive die stations at which are provided individual load sensing probes constructed in accordance with the present invention.

Referring now to the drawings, there is illustrated in FIG. 1 a machine tool, such as a forging machine 10, having a plurality of progressive die stations at which are provided individual load sensing probes constructed in accordance with the present invention. The machine 10 includes a bed frame 12 of any suitable design. A main crankshaft 14 is journalled in the opposite sides of the bed frame 12 and is provided with a crank 16 having a connecting rod 18 journalled thereon. A countershaft 20 is geared to the crankshaft 14 for rotation at the same speed as the crankshaft 14. The bed frame 12 is provided at its forward end with a die breast 22. Within guideways formed in the bed frame 12, a header slide 24 is mounted to reciprocate toward and away from the die breast 22. The connecting rod 18 is pivoted on the slide 24 to produce reciprocation thereof in response to rotation of the crank 16.

Wire or rod stock 26 is fed through the bed frame 12 by any conventional type of feed rollers or the like. The wire stock 26 is sheared at a shearing station 28 into blanks. A shearing mechanism (not shown), such as that disclosed in U.S. Pat. No. 2,721,343, shears off a blank and carries it into horizontal alignment with successive blank working stations 30, 32, 34, and 36. Transfer fingers (not shown) of a transfer mechanism, such as that disclosed in U.S. Pat. No. 2,026,823, operate to grip blanks ejected from tooling dies 38 at the blank working stations 30 through 36 and progressively position the ejected blanks in front of the next station for subsequent tooling. The transfer system is powered in timed relationship to the movement of the header slide 24 so that blanks are progressively moved to each of the working stations 30 through 36 at proper times in the reciprocation cycle of the slide 24.

Figure 2:
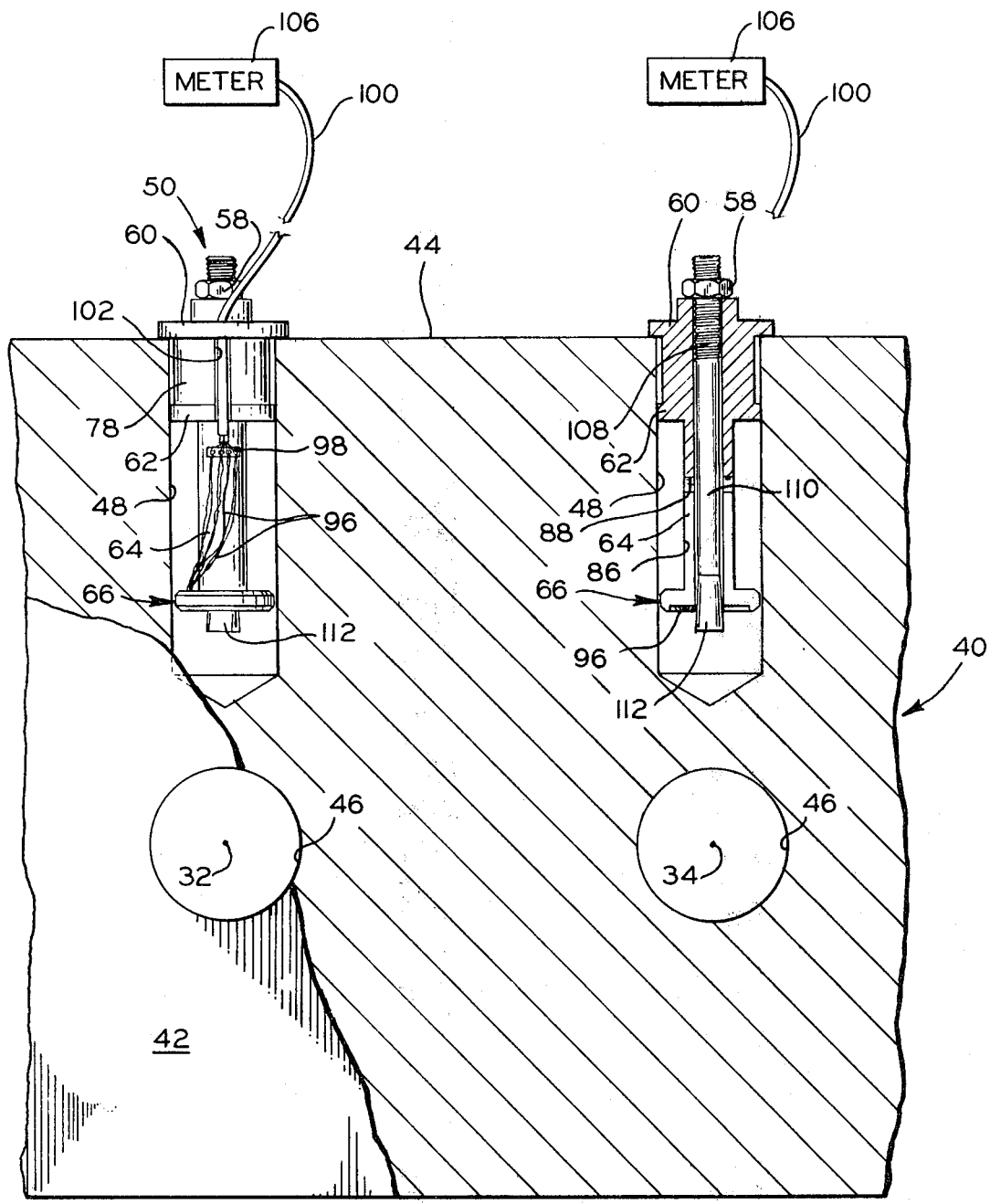
FIG. 2 is a fragmentary elevational view, partially in cross-section, taken along line 2—2 of FIG. 1 illustrating a die block face plate having two load sensing probes mounted therein.

Removably fixed to the die breast 22 is a die block back-up member, such as a face plate 40. The face plate 40 supports the tooling dies 38 during working periods by sustaining the compressive forces generated by the movement of the header slide 24. A working face 42 of the face plate 40 faces toward the header slide 24 and supports the tooling dies 38 at the successive working stations 30 through 36 against working forces directed principally along axes parallel to the movement of the slide 24. A side face 44 of the plate 40 extends generally at right angles to the working face 42 in a plane spaced laterally of the blank working stations 30 through 36. As shown in FIG. 2, successive holes 46 formed in the face plate 40 receive knock-out pins (not shown) for ejecting blanks from the tooling dies 38. The holes 46 are in registration with the respective blank working stations 30 through 36 and extend from the working face 42 through the body of the plate 40. The holes 46 are formed along axes generally parallel to the direction of movement of the slide 24. Thus, the principal forces borne on the face plate 40 are directed along axes coincident with the axes of the associated holes 46.

At each of the blank working stations 30 through 36 there is formed in the face plate 40 a cylindrical cavity 48 extending laterally, and preferably radially, toward the axis of the hole 46. Each cavity 48 extends from a point adjacent the hole 46 through the side face 44 of the plate 40. The cavities 48 are spaced axially from the working face 42 of the plate 40 and retain probes 50, as seen in FIG. 1. Each cavity 48, extending into the side face 44, is generally cylindrical along its length and has its axis in a direction generally normal and radial to the tool axis, as defined by the axis of the blank work stations 30 through 36 of its associated hole 46.

Figure 3:
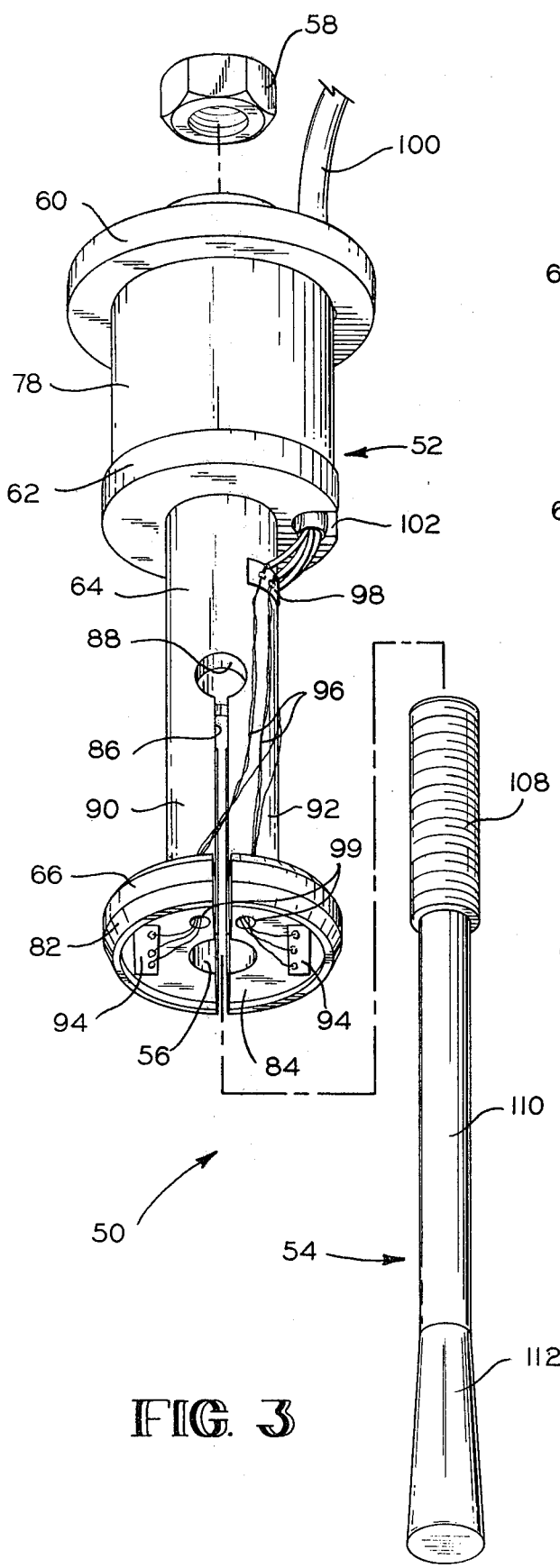
FIG. 3 is an exploded perspective view of one of the load sensing probes of FIG. 2.
Figure 4:
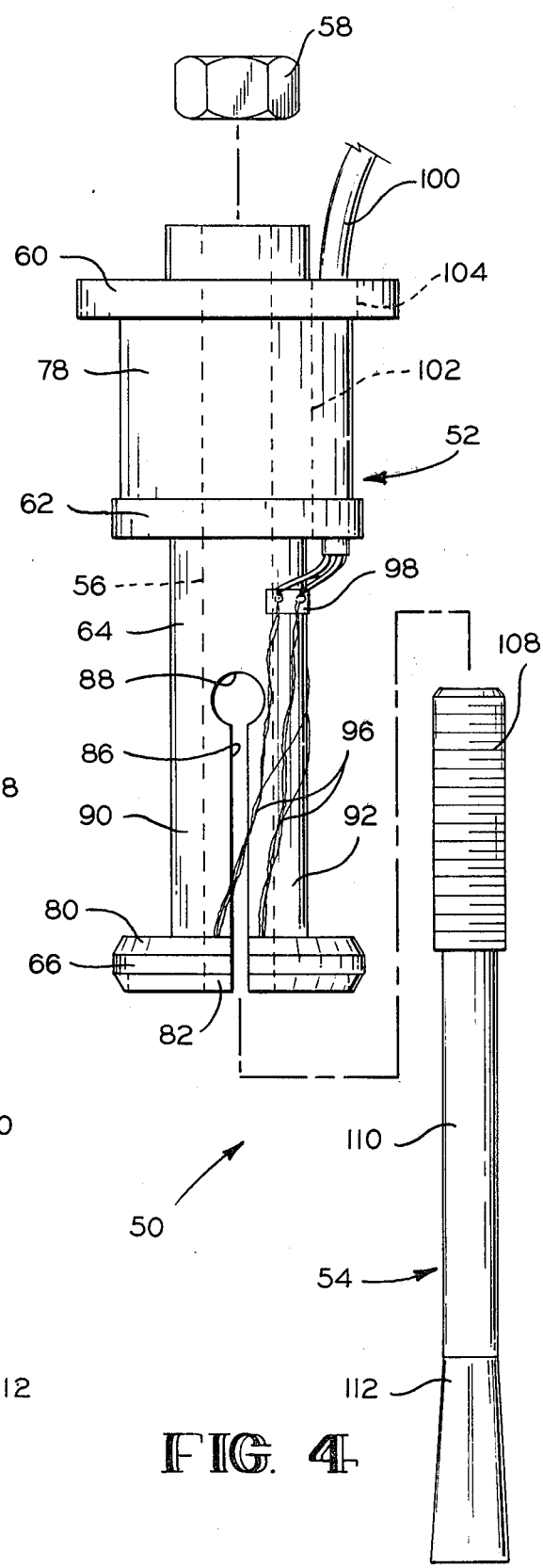
FIG. 4 is a side elevational view of the load sensing probe of FIG. 3.

As illustrated in FIG. 2, a loading sensing probe, indicated generally at 50, is inserted within each of the cavitities 48. The probe 50 is generally cylindrical and includes a split plug member 52 and a plug pin 54 (FIGS. 3 and 4). As will be explained in greater detail below, the plug pin 54 is inserted into and extends through a longitudinal axial aperture 56 formed in the split plug member 52 into threaded cooperation with an adjusting nut 58.

FIGS. 3 and 4 more clearly illustrate the structure of the probe 50. The split plug member 52 includes an enlarged head portion 60, a generally cylindrical shoulder portion 62, an elongate stem portion 64, and a sensing portion 66. The head 60 is larger in diameter than the diameter of the cavity 48 formed in the face plate 40.

The shoulder 62 of the split plug 52 has a diameter which provides a sliding fit within the cavity 48. If desired, an O-ring (not shown) can be disposed about the periphery of a narrower diameter portion 78 of the shoulder 62 to seal contaminants out of the cavity 48. The stem 64 of the split plug 52 is relatively narrow and elongate in construction, affording a clearance fit within the cavity 48. The sensing portion 66 is a generally disk-shaped member disposed at the end of the stem 64 in a plane perpendicular to the longitudinal aperture 56 formed in the split plug 52. The sensing member 66 has a diameter which provides a sliding fit within the cavity 48. The upper and lower edges, 80 and 82 respectively, of the sensing member 66 are beveled to permit easy sliding movement of the probe 50 during insertion or withdrawal from the cavity 48. A sensing face 84 of the sensing member 66 is recessed inwardly of the lower beveled edge 82 thereof.

A slot 86 is formed in a portion of the stem 64 and in the sensing member 66 of the split plug 52. The slot 86 extends through the center of the sensing member 66 and upwardly approximately half the length of the stem 64 towards the shoulder 62, terminatng in a generally circular end portion 88. The slot 86 divides the sensing member 66 and the portion of the stem 64 into two sensing arm portions 90 and 92, which arms 90 and 92 can be flexibly moved inwardly and outwardly with respect to the longitudinal axis of the split plug 52. As will be described in greater detail below, the sensing arms 90 and 92 are flexibly movable outwardly such that the sensing members 66 engage the inside wall of the cavity 48 for sensing relative closing movement of the cavity 48 caused by compressive strain in the face plate 40.

A plurality of conventional strain gauges 94 are suitably attached to the sensing face 84 of the sensing member 66. Although any number of such strain gauges 94 can be used, it has been found desirable to attach one strain gauge 94 to the sensing face 84 on each of the sensing arms 90 and 92. Each strain gauge 94 is electrically connected by a plurality of wires 96 to a set of contacts 98. The wires 96 extend through passage means formed in split plug 52, such as a plurality of apertures 99 formed in the sensing member 66. The contacts 98 are attached to the stem 64 of the split plug 52 to provide a secure electrical and mechanical connection between the wires 96 and a shielded cable 100. The cable 100 extends along a groove 102 formed in the shoulder 62 and through an aperture 104 formed in the head portion 60 out of the probe 50 to a conventional external meter 106. The meter 106 is sensitive to the changes in electrical resistance of the strain gauges 94 caused by changes in stress applied to the sensing member 66, as will be explained below.

The plug pin 54 includes a preloading means for moving the sensing arms 90 and 92 and their sensing member 66 into contact with the inside wall of the cavity 48. More specifically, the plug pin 54 is utilized to preload the sensing members 66 of the sensing arms 90 and 92 of the split plug 52 to a predetermined initial level of compression. The pin 54 includes a threaded end portion 108 connected by an elongate shaft 110 to an outwardly tapering end portion 112. As mentioned above, the pin 54 extends longitudinally through the central aperture 56 formed in the split plug 52 into threaded cooperation with the nut 58. As the nut 58 is tightened, it engages the head 60 of the split plug 52, causing the tapered end 112 of the pin 54 to be drawn upwardly within the central aperture 56 of the split plug 52 until it slidably engages the inside edge of the sensing member 66. The tapered end 112 of the pin 54 pushes the sensing arms 90 and 92 outwardly until the sensing member portions 66 on each of the arms 90 and 92 engage the inside wall of the cavity 48. By further tightening of the nut 58, the amount of preloaded compression on the sensing member 66 can be adjusted to a desired level.

To utilize the load sensing probe 50, the plug pin 54 is first inserted longitudinally through the central aperture 56 of the split plug 52 into threaded engagement with the nut 58. The probe 50 is inserted within the cavity 48. The nut 58 is then tightened, thereby drawing the plug pin 54 upwardly within the central aperture 56 the split plug 52. The tapered end 112 of the pin 54 slidably engages the inside edge of the sensing member 66, causing the sensing arms 90 and 92 to be pushed outwardly until the sensing members portions 66 of the arms 90 and 92 engage the inside wall of the cavity 48. The sensing member 66 is then compressed to a desired predetermined initial level and calibrated by use of the external meter 106.

Since the sensing member portions 66 define a circular shape before they are moved outwardly by the upward movement of the pin 54, it will be appreciated that only a segment of the perimeter of each of the sensing member portions 66 will firmly engage the inside wall of the cavity 48. As shown in FIG. 2, a small gap will be formed between the inside wall of the cavity 48 and the perimeter of the sensing portions 66 near the slot 86. Hence, it is desirable to orient the split plug 52 within the cavity 48 such that the slot 86 is generally perpendicular to the propagation of the working forces generated at the working stations 30, 32, 34, and 36.

Tool loading impressed on the face plate 40 through the working face 42 in the vicinity of each hole 46 places the underlying material of the face plate 40 in compression. This compression of the face plate 40 moves the sides of the cavity 48 into a relative closing movement in a direction generally parallel to the plane of the sensing face 84. The strain experienced in the sensing member 66 is proportional to the tool working forces applied on the working face 42 of the face plate 40, causing dimensional changes in the sensing member 66. In a known manner, the strain gauges 94 operate as a transducer to modify and transmit electrical signals proportional to the strain experienced in the sensing member 66. These electrical signals are conducted through the wires 96 and can be measured and monitored by the meter 106. Actual signals can be compared with ideal signals to detect tool failures, improper tool adjustment, premature wear, imperfect work pieces, and other defects to effectuate overall cost savings and improved product uniformity.

The elongate structure of the probe 50, with its sensing portion 66 occupying a relatively small space in the active area of the face plate 40, is particularly adapted for use in machines where space is limited in the area to be monitored. The configuration of the probe 50 is especially useful in applications similar to that disclosed wherein a plurality of die stations or like zones are provided on a common support or back-up plate. It will be appreciated, however, that the probe 50 and the accommodating cavity 48 can be shaped in any convenient configuration to suit particular sensing needs.

By virtue of its arrangement in a similarly-shaped receiving cavity, the probe 50 is discriminating in its measurement of the local loading at its associated blank working station and avoids undo influence of varying loads at adjacent blank working stations. For this reason, a unitary support block, such as the face plate 40, and its attended advantages can be employed in the support of tools at successive stations while still affording individual force measurement at face stations.

In accordance with the provisions of the patent statutes, the principle and mode of operation of the present invention have been explained and illustrated in its preferred embodiment. However, it must be understood that the present invention can be practiced otherwise than as specifically explained and illustrated without departing from its spirit or scope.

What is claimed is:

1. In a machine tool having a back-up member arranged to support a tool at a working station during a working period by sustaining work forces and subject to strain from the work forces applied to the tool, the back-up member having a cavity formed therein, a load sensing probe confined in said cavity for measuring the work forces applied to the back-up member comprising:
 a generally cylindrical member adapted for insertion in the cavity including an elongate stem and sensing portions disposed at one end of said stem, said member having a slot formed between said sensing portions and a part of said stem to define a pair of sensing arms;
 strain gauge means attached to each of said sensing portions of said sensing arms for measuring the amount of force applied thereto; and
 preloading means for flexibly moving said sensing arms outwardly such that said sensing portions engage an inside wall of the cavity at a predetermined initial level of compression, whereby when work forces applied to the back-up member cause relative closing movement of the cavity, said closing movement can be measured as a change from the amount of preload compression applied to said sensing portions.

2. A load sensing probe in accordance with claim 1 wherein said cylindrical member further includes an enlarged head portion disposed at the other end of said stem, said head having a larger diameter than the cavity.

3. A load sensing probe in accordance with claim 2 wherein said cylindrical member further includes a generally cylindrical shoulder portion disposed between said other end of said stem and said head, said shoulder being sized to provide a sliding fit in the cavity.

4. A load sensing probe in accordance with claim 3 wherein said sensing portions include a disk-shaped member disposed in a plane perpendicular to the longitudinal axis of said cylindrical member, said disk-shaped member being split by said slot.

5. A load sensing probe in accordance with claim 4 wherein said strain gauge means includes a plurality of strain gauges attached to said disk-shaped member.

6. A load sensing probe in accordance with claim 5 wherein one strain gauge is attached to an inwardly-recessed face of said disk-shaped member on each of said sensing arms.

7. A load sensing probe in accordance with claim 6 wherein said cylindrical member has a passage means formed therein for allowing said strain gauges to be connected to an external meter by a plurality of wires.

8. A load sensing probe in accordance with claim 7 wherein said passage means includes an aperture means formed in said sensing portions and said head and a groove means formed in said shoulder for allowing the passae of said wires therethrough.

9. A load sensing probe in accordance with claim 1 wherein said preloading means includes a pin means adapted for insertion in said slot for adjustably moving said sensing arms outwardly.

10. A load sensing probe in accordance with claim 9 wherein said pin means includes an outwardly tapering end portion for frictionally engaging the inside edges of said sensing arms, whereby said sensing arms are flexibly moved outwardly such that said sensing portions engage the inside wall of the cavity.

11. A load sensing probe in accordance with claim 9 wherein said pin means extends through a longitudinally-extending coaxial aperture formed in said cylindrical member into threaded engagement with an adjusting nut, whereby tightening of said nut draws said pin means upwardly through said coaxial aperture such that an outwardly tapered end portion frictionally engages the inside edges of said sensing arms.

12. In a machine tool having a back-up member arranged to support a tool at a working station during a working period by sustaining work forces and subject to strain from the work forces applied to the tool, the back-up member having a cavity formed therein extending laterally from a point adjacent the working station to an exposed face on the back-up member, a load sensing probe confined in said cavity for measuring the work forces applied to the back-up member comprising:

a split plug member adapted for insertion in the cavity including an elongate stem and sensing portions disposed at one end of said stem, said split plug having a longitudinally-extending aperture formed therethrough and having a slot formed between said sensing portions and a part of said stem defining a pair of sensing arms;

strain gauge means attached to each of said sensing portions of said sensing arms for measuring the amount of force applied thereto; and a plug pin adapted for insertion through said split plug aperture for flexibly moving said sensing arms outwardly such that said sensing portions engage an inside wall of the cavity at a predetermined initial level of compression, whereby when work forces applied to the back-up member cause relative closing movement of the cavity, said closing movement can be measured as a change in the amount of preloaded compression applied to said sensing portions.

13. A load sensing probe in accordance with claim 12 wherein said longitudinally-extending aperture is coaxial with the longitudinal axis of said split plug.

14. A load sensing probe in accordance with claim 13 wherein said plug pin includes an outwardly tapering end portion for frictionally engaging the inside edges of said sensing arms, whereby said sensing arms are flexibly moved outwardly such that said sensing portions engage the inside wall of the cavity.

15. A load sensing probe in accordance with claim 14 wherein said plug pin further includes a threaded end portion connected by an elongate shaft to said outwardly tapering end portion, said threaded end portion extending through said plug pin into threaded engagement with an adjusting nut, whereby tightening of said nut draws said plug pin upwardly through said coaxial aperture such that said outwardly tapered end portion frictionally engages the inside edges of said sensing arms.

16. A method of measuring the work forces applied to a back-up member in a machine tool, the back-up member being arranged to support a tool at a working station during a working period by sustaining work forces, comprising the steps of:

a. forming an elongate cavity in the back-up member, the cavity extending laterally from a point adjacent the working station to a face of the back-up member;

b. inserting a generally cylindrical member into the cavity, said cylindrical member including an elongate stem, sensing portions disposed at one end of the stem, a slot formed between the sensing portions and a part of the stem defining a pair of sensing arms, and strain gauge means attached to each of the sensing portions of the sensing arms for measuring the amount of force applied thereto;

c. flexibly moving the sensing arms outwardly such that the sensing portions engage an inside wall of the cavity at a predetermined initial level of compression; and d. measuring the work forces applied to the back-up member as relative closing movement of the cavity caused by work forces applied to the back-up member, which movement can be measured as a change in the amount of the predetermined initial level of compression applied to the sensing portions.

17. A method of measuring work forces in accordance with claim 16 wherein step c. is performed by inserting a plug pin through a longitudinally-extending coaxial aperture formed in the cylindrical member, the plug pin having an outwardly tapering end portion for frictionally engaging the inside edges of the sensing arms.

* * * * *